United States Patent

[11] 3,588,428

| [72] | Inventor | Kurt H. Sennowitz |
| | | Royal Oak, Mich. |
| [21] | Appl. No. | 851,882 |
| [22] | Filed | Aug. 21, 1969 |
| [45] | Patented | June 28, 1971 |
| [73] | Assignee | Elox Inc. |
| | | Troy, Mich. |

[54] GAP OPEN CIRCUIT PROTECTIVE SYSTEM FOR ELECTRICAL DISCHARGE MACHINING
7 Claims, 2 Drawing Figs.

| [52] | U.S. Cl. | 219/69P, 219/69C |
| [51] | Int. Cl. | B23b 1/08 |
| [50] | Field of Search | 219/69 (C), 69 (F), 69 (G), 69 (P) |

[56] References Cited
UNITED STATES PATENTS
3,158,728  11/1964  Webb ............... 219/69(C)

*Primary Examiner*—R. F. Staubly
*Attorney*—Radford W. Luther

ABSTRACT: A circuit is provided to sense gap open circuit condition on initial or later downfeed of the electrode. Responsive to voltage level indicative of such condition, a portion of the drive voltage for the gap output switch is fed back, stored, amplified and applied to control the circuit pulser to narrow machining pulse on-time.

INVENTOR.
KURT H. SENNOWITZ
BY
Harry R Dumont
ATTORNEY

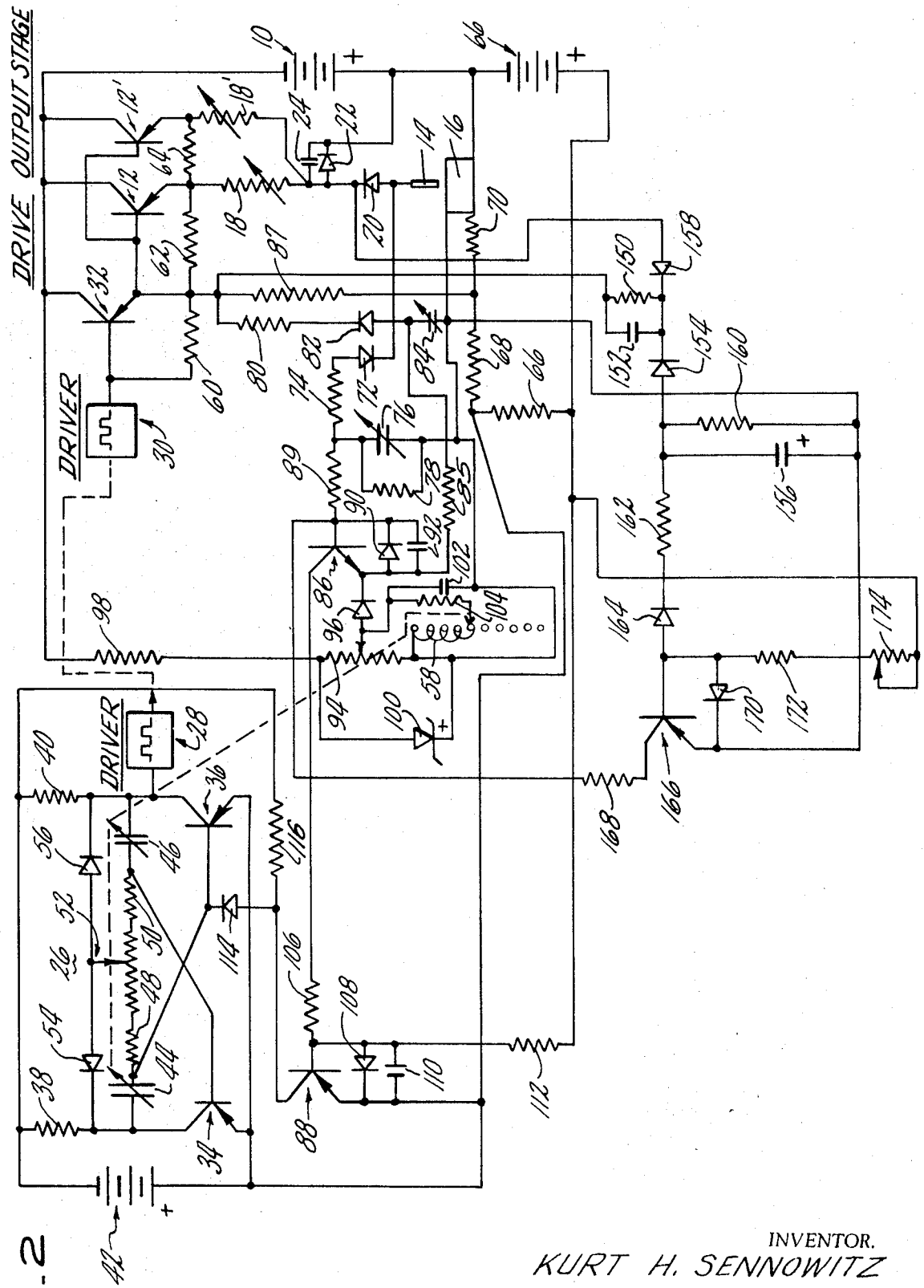

GAP OPEN CIRCUIT PROTECTIVE SYSTEM FOR ELECTRICAL DISCHARGE MACHINING

BACKGROUND OF THE INVENTION

The field to which my invention relates is that known as electrical discharge machining in which material is removed from an electrically conductive workpiece by the action of electrical gap discharges between a tool electrode and the workpiece. An electrode or workpiece servo feed system is used to provide relative movement to maintain an optimum gap spacing between electrode and workpiece as material is removed. A dielectric coolant is circulated and recirculated through the gap during machining operation. For most reliable and predictable result, a power supply circuit of the independent pulser type is utilized to provide machining pulses of precisely controllable frequency and on-off time.

During the machining operation, the gap may become bridged by workpiece particles to cause a condition known as gap short circuit. This condition is accompanied by excessive localized heat which tends to damage both electrode and workpiece unless corrective action is taken. Gap open circuit voltage is similarly a problem. Voltage of an excessive level can contribute to excessive sludge buildup and DC arcing. This is critical at the beginning of a cut, particularly if only a small portion of the electrode is initiating the cut such as occurs in narrow slot machining operations. Reference is made to my copending U.S. Application No. 723,726 entitled "Electrical Discharge Machining Pulse Current Control Apparatus," filed on Apr. 24, 1968, now abandoned. The above identified application discloses and claims one complete system for combined short circuit and open circuit pulse narrowing. The present application is directed to an improved open circuit pulse narrowing circuit which will automatically reduce the current until a larger area is ready for cutting.

BRIEF DESCRIPTION OF THE DRAWINGS

FIG. 2 is essentially similar to FIG. 1 and includes an alternate embodiment of my invention.

DESCRIPTION

Figure 1:
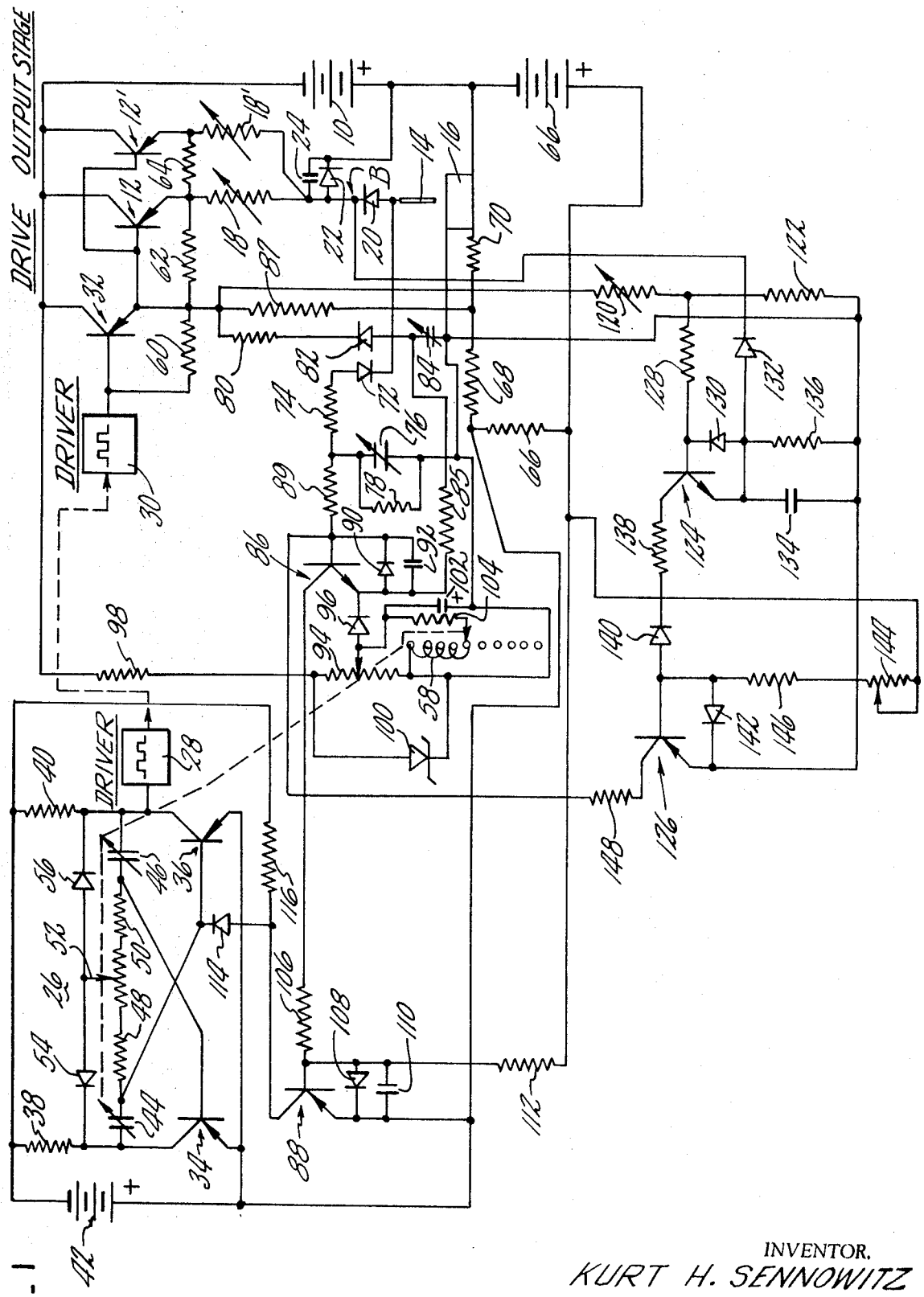
FIG. 1 is a combined schematic and block diagrammatic showing a complete EDM protective circuit and incorporating my invention in that portion of the circuit related to gap open circuit control.

Referring now to the FIG. 1 drawing, the main machining power source 10 is shown connected with output stage transistors 12, 12' and in series with the machining gap comprising tool electrode 14 and workpiece 16. Gap current magnitude is controlled by resistors 18, 18'. Rectifier 20 is included in series between electrode 14 and the output stage transistors 12, 12' to permit high gap voltage operation without damage to these transistors. Diode 22 and capacitor 24 are included to clamp transistors 12, 12' to the positive terminal of DC supply 10 to eliminate high voltage spikes.

Multivibrator stage 26 and driver stages 28, 30 and 32 are used to pulse the output stage transistors 12, 12'. In the interest of simplification stages 28, 30 have been shown in block form.

Included in multivibrator 26 are a pair of transistors 34, 36, biased and coupled for alternate operation in the astable multivibrator mode. Transistors 34 and 36 are connected respectively through load resistors 38 and 40 to the negative terminal of DC source 42. Cross coupling capacitors 44, 46 are adjustable by ganged control and cross-couple the collectors of transistors 34, 36 each to the opposing transistor base. Limiting resistors 48, 50 and potentiometer 52 are included in the multivibrator circuit with the on-off time, i.e. pulse width, controlled by the setting of potentiometer 52. Blocking diodes 54, 56 are connected as shown in circuit with the movable contact of potentiometer 52. The frequency of the multivibrator operation and hence of the machining power pulses furnished to the gap may be selectively altered by changing the values of capacitors 44, 46 by a ganged switch as indicated by the dash lines between those capacitors. A further dash line is shown between capacitor 46 and tap switch 58 to provide for automatic control of reference voltage level responsive to change of multivibrator operating frequency. The pulse output from multivibrator 26 is suitably amplified and resquared through intermediate drive stages 28, 30 and 32 to render output transistors 12, 12' alternately conductive and nonconductive to provide machining pulses to the gap. While the present invention employs transistors as electronic switches, the invention is not so limited but, with proper redesign of the circuit by one skilled in the art, any electronic switches, the invention is not so limited but, with proper redesign of the circuit by one skilled in the art, any electronic switch may be substituted. Resistors 60, 62 64 protect the base-emitter junction of their respective transistors from excess turn-off voltage.

The remainder of the circuit shown in FIG. 1 relates to the short circuit and open circuit protective system. With reference to the former, a bias source 66 is included with resistors 60, 68, 70 connected as a voltage divider. The sensing network connected to electrode 14 includes diode 72 which serves to store gap voltage through resistor 74 on capacitor 76 whose charge and discharge rate depends on the values of resistor 78 and capacitor 76. The setting of variable capacitor 76 is normally such to provide cutoff delay during roughing, high current cutting and fast cutoff during finish cutting, especially when performed at high frequencies.

A separate network is connected to the drive stage comprising transistor 32. This network is designed to feed back, store and amplify a portion of the drive signal to provide pulse narrowing operation on multivibrator 26, particularly with regard to transistor 36 which is the on-time control switch. Included in this network are resistor 80, diode 82 and capacitor 84. The drive signal taken from the emitter of transistor 32 charges capacitor 84 to the polarity shown. Resistor 85 with the reference voltage level across capacitor 84 determines the charge and discharge level and the time constant. Capacitor 84 is embodied as a variable capacitor to permit adjustment for the desired gap current during a gap short circuit condition or before the gap actually shorts, depending on the reference voltage adjustment. Load resistor 87 is connected between the emitter of transistor 32 and a positive voltage derived from bias source 66.

Actual control over machining power pulse duration is exercised through cutoff transistors 86 and 88. Resistor 89 is the drive limiting resistor for transistor 86. Diode 90 protects the base to emitter junction of transistor 86 from excess turn-off voltage. Capacitor 92 prevents pretriggering of transistor 86 due to stray signals. Transistor 86 is in a nonconductive state so long as the negative electrode gap voltage on its base is more negative than the present reference voltage on variable resistor 94 applied through hold-off diode 96 to its emitter. Resistor 98 is a part of the divider network across bias source 10. Zener diode 100 stabilizes the reference voltage while capacitor 102 provides a filter for the preset reference voltage. As has already been indicated, resistor 104 is switched across the preset portion of variable resistor 94 conjointly with each change made in frequency to the multivibrator by adjustment of capacitors 44, 46. I have found that certain electrode materials cut a great deal more efficiently when a higher cutoff reference voltage is used along with the higher frequency settings of multivibrator 26.

The short circuit cutoff transistor 86 has its collector connected to the base of transistor 88 through drive limiting resistor 106. Diode 108 is a protective diode for the base to emitter junction while capacitor 110 filters out stray pickup to prevent pretriggering of transistor 88. Resistor 112 applies a positive bias signal across the emitter-base junction of transistor 88 during its off-time. Diode 114 isolates the cutoff circuit from the base of transistor 36 during normal machining operation. Resistor 116 is connected to the negative terminal of source 42 and to the rectifier 114, transistor 88 collector junction to insure normal multivibrator operation during cutting.

The open circuit pulse narrowing circuit similarly uses cutoff transistors 86 and 88 to exercise its current reducing function. A reference network is connected between the emitter of drive transistor 32 and the plus arc terminal provided by workpiece 16. This network includes series resistors 120 and 122 connected as a voltage divider. The open circuit pulse narrowing circuit includes transistors 124 and 126. Resistor 128 is the drive limiting resistor for transistor 124. Rectifier 130 protects the base to emitter junction from excess turnoff voltage. A gap voltage sensing network is connected between the lead to electrode 14 and the emitter of transistor 124. This network includes diode 132 and capacitor 134. It will be seen that diode 132 senses and peak stores a portion of the gap voltage on capacitor 134, to provide a gap voltage signal on the emitter of transistor 124. Resistor 136 across capacitor 134 determines the RC time constant of operation. Transistor 124 will conduct when the negative gap voltage at point B and on the emitter of transistor 124 is more negative than the preset pulsed voltage on the base of transistor 124. Resistor 138 limits the drive current to the base of transistor 126 through isolating diode 140. Diode 142 protects the base to emitter junction of transistor 126 from excess turnoff voltage. Variable resistor 144 is connected to the positive terminal of bias source 66 and in series with resistor 146. Resistor 148 is the transistor current limiter.

The current of FIG. 2 is substantially the same as FIG. 1 with respect to the power supply circuit and that portion of the circuit related to short circuit condition current control. The open circuit current control portion has some differences. Resistor 150 and capacitor 152 couple the drive signal during transistor 32 off-time through diode 154 to charge capacitor 156 to the polarity shown. Capacitor 156 is shunted by resistor 160. The drive signal will also be passed to the gap through diode 158, if the negative gap voltage drops. Rectifier 158 clamps the drive signal to the minus gap voltage. Drive current limiting resistor 162 and diode 164 transfer the negative drive signal to the base of transistor 166 to turn it on. Load resistor 168 limits the current of transistor 166 and places a positive signal on the base of transistor 86 to turn it on. In the conductive state of transistor 86, transistor 88 is turned on, as has already been explained, to narrow the on-time of multivibrator 26. The associated circuit of transistor 166 is completed by protective diode 170, fixed resistor 172, and variable resistor 174, which resistor is connected to the positive terminal of bias source 66 to provide a positive turnoff bias voltage.

DESCRIPTION OF OPERATION

The description of operation will now be made with special attention given to the short circuit and open circuit protective system and its functioning. During rough machining, multivibrator 26 is preset through potentiometer 52 to provide high current, long on-time pulses. The on-time of the machining pulses is controlled through the conduction of transistor 36 while the off-time is controlled through the conduction of transistor 34. During this mode of operation, variable capacitor 76 is adjusted to give a relatively large cutoff delay period. This serves to improve cutting stability and improve metal removal. During the initial open arc condition when the electrode 14 is being advanced toward the workpiece 16 to start cutting and during normal gap cutting condition, transitor 86 is in its nonconducting state. The negative arc voltage taken from electrode 14 and peak stored on capacitor 76 is applied to the base of transistor 86. Since the applied voltage is more negative than the reference voltage applied to its emitter, it will stay off. During this period, transistor 88 is also nonconducting, so that the multivibrator is not affected in its operation.

When a gap short circuit actually occurs or is impending, the gap voltage will drop below the preset reference voltage applied to the emitter of transistor 86. When the base is rendered more positive than the emitter, transistor 86 will be rendered conductive. This will apply a negative signal to the base of PNP transistor 88 to turn it on. In its conductive state, transistor 88 will place a positive signal on the base of transistor 36 through diode 114 to turn it off. Since transistor 36 controls machining pulse on-time, the pulses will be substantially narrowed. The multivibrator never stops operating, only its frequency and gap on-time are changed just before and during the gap short circuit condition. An adjustable delay is exercised through the discharge of capacitor 84 through resistor 85 into the emitter of transistor 86. This will turn transistor 86 off for a short period during the initial part of the gap short circuit condition and delay the pulse narrowing effect. When roughing is completed, multivibrator 26 is changed to operate at a much higher frequency for finishing the cut. As capacitors 44, 46 are adjusted for the lower pulse frequencies, resistor 104 is switched across the preset portion of variable resistor 94 to provide a relatively low cutoff reference voltage. For the higher frequency settings, resistor 104 is disconnected from across variable resistor 94 to provide a relatively high reference voltage. During the finishing operation, little or no cutoff delay is desirable and capacitor 84 is usually adjusted accordingly.

Open circuit condition operation will now be considered with reference to the circuit of FIG. 1. On initial downfeed, it is important that the on-time be shortened and the off-time be lengthened for a lower frequency than the normal cutting frequency. This serves not only to protect the workpiece 16 and electrode 14 from damage but also to protect the output stage switches 12, 12' from damage when current is passed at higher voltage than normal cutting voltage. Transistor 124 is normally nonconductive. The desired open arc narrowing voltage range is set on the reference voltage divider network comprising resistors 120 and 122 and applied to the base of transistor 124. The gap voltage is sensed through diode 132 and peak stored on capacitor 134. When the negative gap voltage sensed is more negative than the preset pulsed reference voltage on its base, transistor 124 will be turned on. This will provide a negative voltage to the base of transistor 126 and turn it on to provide a positive voltage to the base of transistor 86 which will in turn be rendered conductive. The pulse narrowing signal then is passed to the multivibrator in the manner previously described for short circuit narrowing. I have found that the open circuit voltage adjustment available from the resistor 120, 122 network makes possible a fast-acting and positive protection. The open circuit pulse narrowing arrangement of FIG. 2 is similarly connected in the power supply. The voltage signal provided from drive stage 32 during its off-time is coupled through rectifier 154 to charge capacitor 156 to the polarity shown. Transistor 166 is normally in a nonconducting state. The negative drive signal is transferred to the base of transistor 166 to turn it on when gap open circuit level is reached. Resistor 172 and variable resistor 174 are connected to the plus terminal of bias source 66 to hold a turnoff bias on the base of transistor 166. This bias on the base of transistor 166 prevents oscillations and false turn-on during normal cutting. The divider network resistors 150, 160 and capacitors 152, 156 values determine the open circuit pulse narrowing voltage across the gap together with the 174 bias setting required to turn on transistor 166. Once transistor 166 is turned on, it will pass a positive signal to the base of transistor 86 to turn it on and initiate the pulse narrowing operation previously described on multivibrator 26. One feature of the FIG. 2 open circuit pulse narrowing system is that is operates without taking any power from the machining gap or output transistor stages. It actually passes current to the gap through rectifier 158 during normal cutting condition.

It will thus be seen that I have provided a novel and improved circuit for gap open circuit protection.

I claim:

1. In an electrical discharge machining apparatus for machining an electrically conductive workpiece by passing electrical discharges across a dielectric coolant filled gap between a tool electrode and the workpiece, an electronic output switch and a power supply operatively connected across said gap, a drive stage for said switch, a pulser means operatively connected to said drive stage for operating it with pulses of predetermined on-off time, wherein the improvement comprises a circuit for reducing the on-time of said pulses responsive to gap open circuit condition, said circuit comprising a reference voltage network including a pair of resistors connected in series combination, said combination connected between the output of said drive stage and one of the terminals of said gap for pulsing said reference voltage during drive stage off time, a sensing network connected to the other terminal of said gap for sensing gap voltage, and an electronic switch having its control electrode and one of its principal electrodes operatively connected to said networks, said switch having its output operatively connected to said pulser for reducing its on-time responsive to gap voltage above said reference voltage.

2. The combination as set forth in claim 1 wherein said sensing network includes a diode and a capacitor for peak storage of signal.

3. In an electrical discharge machining apparatus for machining an electrically conductive workpiece by passing electrical discharges across a dielectric coolant filled gap between a tool electrode and the workpiece, an electronic output switch and a power supply operatively connected across said gap, a drive stage for said switch, a pulser means operatively connected to said drive stage for operating it with pulses of predetermined on-off time, wherein the improvement comprises a circuit for reducing the on-time of said pulses responsive to gap open circuit condition, said circuit comprising a reference voltage network including a pair of resistors connected in series combination, said combination connected between the output of said drive stage and one of the terminals of said gap for pulsing by said drive stage during drive stage off-time, a sensing network, said sensing network diode coupled to the other terminal of said gap for sensing gap voltage level, and an electronic cutoff switch having a control electrode and a pair of power electrodes, said control electrode coupled to the junction of said resistors in said reference network, one of said power electrodes coupled to said sensing network, the other of said power electrodes connected to said pulser for providing an output thereto for reducing its on-time responsive to gap voltage level above said reference voltage level.

4. In an electrical discharge machining apparatus for machining an electrically conductive workpiece by passing electrical discharges across a dielectric coolant filled gap between a tool electrode and the workpiece, an electronic output switch and a power supply operatively connected across said gap, a drive stage for said switch, a pulser means operatively connected to said drive stage for operating it with pulses of predetermined on-off time, wherein the improvement comprises a circuit for reducing the power content of said pulses responsive to gap open circuit condition, said circuit comprising a divider network connected between the output of said drive stage and one of the terminals of said gap, for sensing gap open circuit level, said divider network including a pair of serially connected resistors, each shunted by a different capacitor, an electronic switch having a control electrode and a pair of power electrodes, said control electrode coupled to said divider network, an adjustable hold-off bias source coupled to said control electrode, and one of said power electrodes operatively connected to said pulser for reducing its on-time responsive to said condition.

5. In an electrical discharge machining apparatus for machining an electrically conductive workpiece by passing electrical discharges across a dielectric coolant filled gap between a tool electrode and the workpiece, an electronic output switch and a power supply operatively connected across said gap, a drive stage for said switch, a pulser means operatively connected to said drive stage for operating it with pulses of predetermined on-off time, wherein the improvement comprises a circuit for reducing the on-time of said pulses responsive to gap open circuit condition, said circuit comprising a variable reference voltage network and a unidirectional current conducting device series connected between the output of said drive stage and one terminal of said gap, a sensing network operatively connected to said gap for providing a voltage output representative of gap voltage, and a cutoff electronic switch having a pair of power electrodes and a control electrode, said control electrode connected to said divider, one of said power electrodes connected to said sensing network and the other of said power electrodes coupled to said pulser means for reducing on-time of said pulser responsive to gap voltage above said reference voltage level.

6. In an electrical discharge machining apparatus for machining an electrically conductive workpiece by passing electrical discharge across a dielectric coolant filled gap between a tool electrode and the workpiece, an electronic output switch and a power supply operatively connected to provide machining power pulses across said gap, a drive stage for said switch, a pulser means operatively connected to said drive stage for operating it with pulses of predetermined on-off time, wherein the improvement comprises a circuit for reducing the on-time, of said pulses responsive to gap open circuit condition, said circuit comprising a reference voltage network connected between said drive output and one terminal of said gap for pulsing by said drive stage during its off-time, said reference voltage network further including a voltage divider connected to the output of said drive stage, a sensing network operatively connected to said gap for providing a voltage output representative of gap voltage, a cutoff electronic switch having a pair of power electrodes and a control electrode, said control electrode connected to said voltage divider, one of said power electrodes connected to said sensing network and the other of said power electrodes coupled to said pulser means for reducing on-time of said pulse responsive to gap open circuit, and means operatively connected between said reference network and said gap for passing drive current to said gap responsive to gap voltage below said gap open circuit level.

7. In an electrical discharge machining apparatus for machining an electrically conductive workpiece by passing electrical discharges across a dielectric coolant filled gap between a tool electrode and the workpiece, an electronic output switch and a power supply operatively connected to provide machining power pulses across said gap, a drive stage for said switch, a pulser means operatively connected to said drive stage for operating it and said switch with pulses of predetermined on-off time, wherein the improvement comprises a circuit for reducing the on-time of said pulses responsive to gap open circuit condition, said circuit comprising a reference voltage network connected between said drive output and one terminal of said gap for pulsing by said drive stage during its off-time, a sensing network connected to said gap for providing an output representative of gap voltage, a cutoff switch having a pair of power electrodes and a control electrode, said control electrode connected to said pulsed reference network, one of said power electrodes connected to said sensing network and the other of said power electrodes coupled to said pulser means for inhibiting the operation of said pulser responsive to gap voltage level above said reference voltage level indicative of gap open circuit condition, and means operatively connected between said reference network and said gap for passing current to the gap during machining normal operation at levels below gap open circuit level.